3,220,204
CARBONATED ICE PROCESS
Irwin L. Adler, Orangeburg, and Winfried G. Timpe, New City, N.Y., assignors to General Foods Corporation, White Plains, N.Y., a corporation of Delaware
Filed Nov. 14, 1963, Ser. No. 323,786
9 Claims. (Cl. 62—70)

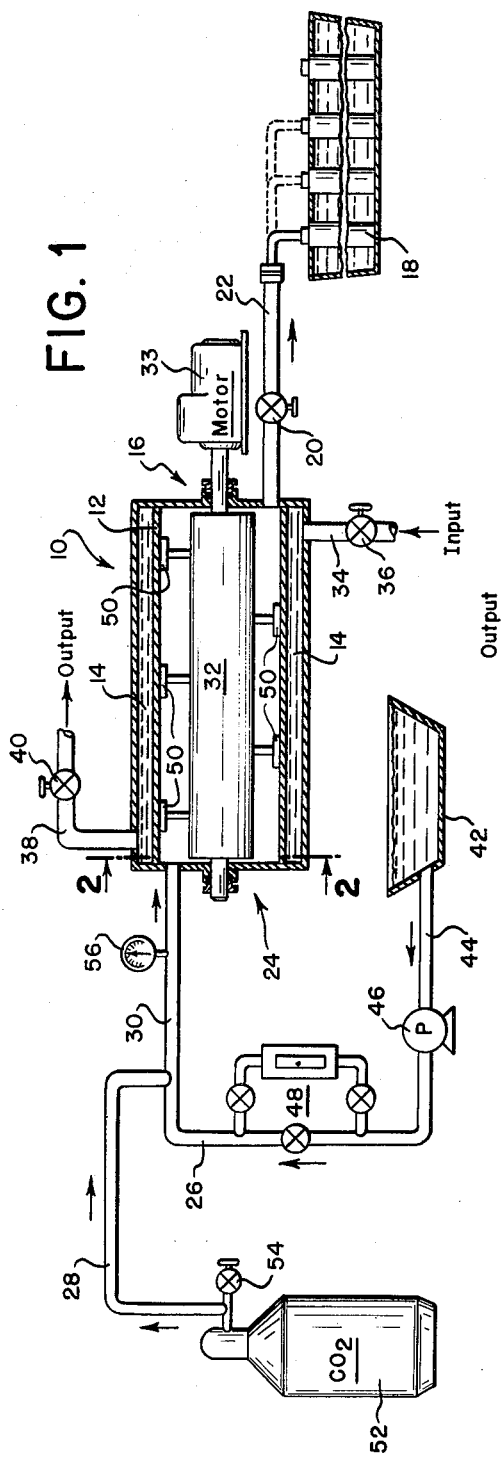
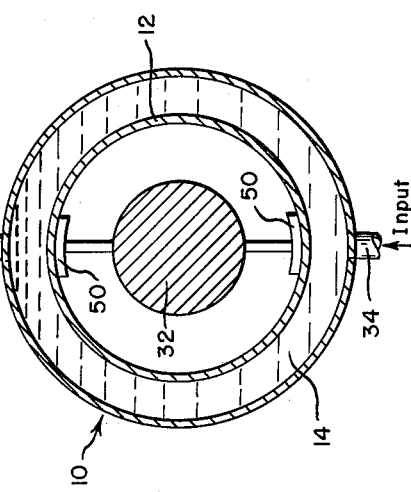

This application is a continuation-in-part of abandoned application Serial No. 209,305, filed July 12, 1962.

This invention relates to a process of producing carbonated ice. More particularly, this invention is concerned with a process for the production of a frozen hydrate of carbon dioxide and water and the conversion thereof to an improved stabilized carbonated ice.

In U.S. Patent No. 2,975,603, dated March 21, 1961, to H. M. Barnes et al., a process is disclosed for the manufacture of a carbonated ice product characterized by a substantial volume of carbon dioxide gas per unit weight of material. This product is produced by subjecting an aqueous liquid to a carbon dioxide pressure of at least about 200 p.s.i.g. and a temperature of 0° to 14° C. while maintaining said aqueous liquid and said carbon dioxide in contact for a sufficient length of time to permit absorption of the carbon doxide into the water in the form of bound carbon dioxide. Primarily, this process is characterized by a batch-wise production of a carbonated ice product containing at least 25 ml. of bound carbon dioxide per gram of ice. The product is stable when stored at temperatures below the freezing point of water and has unique beverage-making properties which allow the product to be added with other ingredients, such as flavoring and confectionery ingredients, to an aqueous liquid to produce beverage products of all types. The product can be distributed in the form of ice cubes, briquettes, bars, or other convenient shapes, and dissolves upon addition to water to give a sustained evolution of carbon dioxide gas over a relatively long period of time.

However, while the produce will retain a significantly high level of carbonation during refrigerated storage, it has been noted that the product has a tendency to explode or "pop"; (i.e., break apart and disintegrate with a loud noise) at an unpredictable point of time during its dissolution; thus, when the carbonated ice product is added to water or milk the product frequently explodes in the glass or other vessel used in the beverage preparation.

Throughout the specification references had to the expression "carbonated ice" is to be understood as applying to a carbon dioxide hydrate and water ice containing the desired amount of bound carbon dioxide; the term "water ice" is applied to a frozen solution of carbon dioxide in water under the pressure and temperature conditions employed in processing. The aqueous or liquid source of the hydrate may take the form of distilled water, tap water, and water containing extraneous solids in either dispersed or soluble form. The aqueous liquids may include whole or skim milk, fruit juices, vegetable juices or plant extracts having desired flavor constituents. Thus, it will be seen that the invention is applicable to the production of a variety of frozen carbonated products, either in a flavored or unflavored form. These products may take the form of a more conventional carbonated beverage or a more unusual product such as carbonated coffee, tea, nectar extracts, or a carbonated confection, i.e., carbonated ice cream, sherbert, and the like.

The present invention relates to improving the batch-process described in the Barnes, et al. patent by a continuous process for making a hydrate of carbon dioxide and water and thus yielding a carbonated ice product which is less prone to the aforesaid explosion which process comprises subjecting an aqueous liquid to a carbon dioxide gas at a pressure and temperature which is above the eutectic point of said water and said carbon dioxide mixture at a temperature sufficiently low to cause a hydrate to be formed, yet which temperature is sufficiently high to prevent excessive amounts of water ice to be formed, said temperature and pressure being kept relatively constant during the formation of said hydrate, and thereafter converting said hydrate to a stable form.

The objects of this invention are attained by continually exposing an aqueous liquid at a high surface to volume ratio to carbon dioxide source, preferably by distributing the aqueous liquid in a thin film over as wide a surface area as possible, while reducing the temperature of said liquid to a point which assures maximum efficiency in solubilizing the carbon dioxide in water and then subsequently reacting the solubilized carbon dioxide with water into a chemically bound hydrate of carbon dioxide and water, continuing such introduction of carbon dioxide into contact with additional portions of said aqueous liquid to continually form a supply of said solution of carbon dioxide and water, maintaining said aqueous liquid and carbon dioxide under continuous temperature and pressure conditions which are above the eutectic point of a mixture of said carbon dioxide, aqueous liquid, hydrate and water ice during formation of said hydrate into a slush-like form, and then converting the formed hydrate to a stable state by reducing the mixture to a temperature whereat the free aqueous liquid freezes.

The formed hydrate may be reduced to a stable condition by simply freezing the mixture at a temperature below —3° C. Freezing at these temperatures will cause free aqueous liquid present in the hydrate slush to be converted into water ice which appears to mitigate reaction with or decomposition of the hydrate during storage and thereby preserves a high level of carbonation in the product, typically a level of about 30 to 50 volumes $CO_2$ per gram of ice.

While the present invention is not to be restricted to or construed in the context of any particular theory, it is believed that the continuous and uniform formation of hydrate promotes the formation of smaller hydrate crystals and that the transfer of these crystals admixed with free aqueous liquid in the form of slush to a second water ice freezing zone assures a discrete and more uniform distribution of said crystals so that they may be incapsulated and hence stabilized in a physically strong water ice matrix. In any event, the carbonated ice product of the process of the present invention is characterized by a significant reduction in the incident of the aforesaid popping during beverage preparation.

In the case of ordinary potable tap water having a freezing point of 0° C. the carbon dioxide is brought into intimate contact (i.e., maximal surface to volume ration) with the water at a superatmospheric pressure of 140–650 p.s.i.g. and a temperature of —3° to 10° C. to solubilize the gaseous carbon dioxide and give a saturated water solution of $CO_2$ (about 3.5% by weight of $CO_2$), maintained under a continuous pressure within the stated pressure range and above —3° C. but below 10° C. during the formation of the hydrate slush and then converted to a stable form by freezing the hydrate and any free water present in the hydrate to a temperature below —3° C.; practically, in order to operate under controllable conditions hydrate will be produced at pressures above 200 p.s.i.g. and a temperature above 0° C. in order to maximize hydrate formation while minimizing collateral formation of water ice. If additives are dissolved in the aqueous phase to lower the freezing point thereof, it will be possible to operate above a lower eutectic point, that is a lower temperature and pressure range during hydrate formation but above the temperature at which the unreacted liquid freezes to a solid. These additives can take various forms as long as they actually serve to lower the freezing point of the aqueous solution. Alcohols, saccharides, etc. will serve to lower the freezing point of said solution; in addition small amounts of other additives may be employed to impart color or flavor and many of these will function similarly to lower the solution freezing point; included among the additives which may be used are flavoring oils, artificial flavors and colors and the like.

In all the foregoing discussion it should be noted that it is a preferred feature of this invention that the hydrate-formation process be a continuous one wherein the hydrate produced is maintained in a transferable pumpable state and the balance of unreacted mixture in a liquid state by operating at a temperature and pressure just slightly above the eutectic point of the mixture.

As the process of the present invention proceeds the aqueous liquid, typically water, is brought into heat and mass transfer relation with the carbon dioxide source in a form which permits maximum heat transfer area as well as maximum solubilization of carbon dioxide in the aqueous liquid during and prior to hydrate formation, respectively. This is preferably done by forming a relatively thin film of the aqueous liquid in a suitable heat exchanger or other vessel which promotes an intimate contact of the carbon dioxide gas and aqueous liquid phases over a wide surface area. Advantageously, this intimate contact can be achieved in a continuous heat exchanger, such as a scraped-wall heat exchanger, although other forms of apparatus are contemplated for achieving this gas transfer to the aqueous liquid. The time for this contact will be a function of the pressure, the feed rate of aqueous liquid, the temperature at which the liquid is maintained to effect this gas transfer, the overall ratio of surface to volume of liquid as well as the efficiency of the mass-transfer apparatus employed.

At the above specified carbon dioxide gas pressures of 140 to 650 p.s.i.g. and at a water temperature of $-3°$ to $10°$ C., the period of contact within the heat exchanger will range anywhere from several seconds to 6 minutes for formation of the solid hydrate. Preferably, the solid hydrate crystals will be formed gradually as distinguished from instantly, that is in 20 to 90 seconds instead of 1–3 seconds. It is a feature of this invention that stable crystals of hydrate are formed by gradual reaction of carbon dioxide and water after solubilization. In the early period of the gas-liquid contact the carbon dioxide will achieve a degree of solubilization close to 17 volumes (about 3.5% by weight of $CO_2$) in the thin aqueous film, and thereafter solid hydrate crystals will be slowly formed over a period of 20–90 seconds, typically less than 60 seconds. A liquid condition should be maintained throughout the $CO_2$-water system during the preliminary gas solubilization as well as the hydrate reaction to assure a substantial degree of hydrate formation.

For most beverage applications between 30 and 50 volumes of carbon dioxide gas per gram of frozen product will be necessary to achieve carbonation. For this reason, it is advantageous in most cases to merely freeze the hydrate slush to below $-3°$ to form the carbonated ice, said carbonated ice containing unbound or free water at a level of about 50–70%. This product typically will contain about 30–50 volumes of carbon dioxide gas per gram of product and will be stable when stored at below $0°$ C., say $-20°$ to $-10°$ C. However, it is realized that this degree of carbon dioxide entrapment in the form of solid hydrate of $CO_2$ and water will in turn be dependent upon the concentration of hydrate in the frozen product. If desired, higher concentrations of hydrate may be formed by removing a part of unreacted or free water from the hydrate slush.

Upon the achievement of a condition in excess of the eutectic point of the aqueous liquid such as assures the provision of a suitable concentration of solid carbon dioxide hydrate, which point it will be understood is dependent upon the presence or absence of certain additives, the refrigerated carbon dioxide solution is then transferred by mechanical displacement or by the influence of gravity to a suitable heat transfer mechanism wherein it is brought into heat exchange relationship with the refrigerating medium and the solution is further cooled to create the requisite concentration of carbon dioxide hydrate necessary to provide a stable carbonated ice product. This heat transfer should be carried out under conditions which promote the gradual formation of the solid hydrate since an accelerated hydrate formation will result in the creation of an unstable product which tends to lose carbon dioxide to the atmosphere.

In general, the heat and mass transfer called for can be effected in a relatively elongated vessel of drum-like or cylindrical form by depositing the liquid on the walls thereof to form a thin film which will solidify into hydrate crystals of carbon dioxide and water; the crystals are then subsequently mechanically scraped or otherwise removed from the walls of the heat exchanger. The hydrate formation is allowed to proceed until such time as a slush or snow-like form of product is produced. Throughout this entire hydrate formation process, the carbon dioxide saturated water and hydrate phases are maintained under a substantially elevated superatmospheric pressure which is above the eutectic point of said liquid and solid phases. In the case of water which freezes at $0°$ C. the pressure will be at least 140 p.s.i.g. and the temperature of the aqueous phase at least $-3°$ C.

It is essential in accordance with the present invention to produce a continuous quantity of hydrate crystals by supplying carbon dioxide gas at a constant pressure. Therefore, the issuing orifice in the heat exchange vessel should be so throttled by the use of valve means to control the supply of carbon dioxide and, hence, hydrate crystal formation. A substantially continuous slush-form of snow-like extrudate will pass through the orifice of the heat exchanger while keeping a constant headspace pressure in the vessel whereat hydrate slush may be continuously produced and scraped from the walls of the heat exchanger while subsequent quantities of the hydrate-water mixture are continuously being supplied. In general, the product issuing from the heat exchange throttling area will have the consistency of a wet sherbet. The product while under superatmospheric pressure may at this stage be pressed under mechanical pressure to yield a free aqueous liquid and a pure hydrate. The free water must be removed at this stage if the pure hydrate is to be stable at atmospheric pressure without further freezing. However, the pure hydrate must still be stored at below $0°$ C.

Upon issuance from the heat exchanger the extrudate will preferably be reduced to stable form by freezing at below $-3°$ C., say $-15°$ C., although prior to freezing it may be further concentrated with respect to the hydrate by various means which remove a portion of the free water present in the hydrate. This may be done by mechanical pressing of the slush in a piston-type press having a screen opening at a convenient point for issuance of free water from the hydrate-free water mixture. However, it has been found practical to simply transfer the free water-hydrate product into a suitable hardening or freezing chamber which may be in the shape of a mold and wherein the hydrate is subjected to static pressures at reduced temperatures below the freezing point of the mixture. Preferably this mixture will be hardened and completely frozen by reducing the temperature to well below the freezing point of water, typically about $-30°$ to $-10°$ C.

The invention will now be more fully described by reference to the following specific operative examples for the process:

*Example 1*

Understanding of the process will be facilitated by reference to the accompanying drawings wherein FIG. 1 is a schematic view of a system for carrying out the process of the present invention; and FIG. 2 is a sectional view taken along line 2—2 in FIG. 1 showing the heat transfer mechanism employed to create the maximal ratio of surface to volume of liquid in accordance with the precepts of the invention.

Referring to the drawing a "Votator" type scraped wall heat exchanger generally shown as 10 having a stationary cylindrical drum 12, 3 inches in diameter by 11 inches in length (0.7 sq. ft. of heat exchange surface area) in proximate relation to wiper blades 50, and a jacketed cooling means 14 was equipped at one end 16 with a pressurized mold 18, 2 inches in diameter and 3 ft. in length. The pressurized mold included a throttling valve 20 in high pressure transfer line 22, the throttling valve being adjusted to maintain a maximum pressure of 250 p.s.i.g. throughout the apparatus during hydrate formation. The other end 24 (inlet portion) of heat exchanger 10 was equipped with a water pipe 26 and a pressurized carbon dioxide gas pipe 28. The carbon dioxide and water sources were combined into a common inlet pipe 30 which connected with the annular chamber between wiper blade shaft 32 driven off motor 33 and stationary drum 12 of the heat exchanger. In this manner, a closed system was thus assured for a continuous pressurized source of carbon dioxide and water entering one end of the heat exchanger and continuously issuing from the other end thereof as hydrate of carbon dioxide and water while keeping the temperature and pressure constant.

The temperature of the refrigerant in the heat exchange jacket 14 was lowered to $-11°$ C., refrigerant being introduced to cooling jacket 14 by pipe 34 under the control of valve 36 and returning from jacket 14 by refrigerant line 38 under the control of valve 40, pipes 34 and 38 communicating with a common refrigerant regeneration system not shown. Inlet water was previously cooled to 2° C. in tank 42 and then pumped from line 44 by pump 46 into heat exchanger from line 26 at a rate of 240 cc. per minute, inlet water rate being controlled by flow meter 48. Inlet water was distributed over the inner wall 12 of heat exchanger 10 by a series of wiper blades 50 to give a water film thickness less than about 0.01 inch. The carbon dioxide was fed at a rate of 40,000 cc. per minute (S.T.P.) into the heat exchanger from a high pressure source 52 (700 p.s.i.g.) and excess $CO_2$ was throttled through the throttling valve 20 in the pressurized mold 18 thereby maintaining a constant pressure of 250 p.s.i.g. inside the heat exchanger as measured by a standard Bourdon pressure gauge 56 inserted in line 30.

A substantial portion of the carbon dioxide was dissolved immediately in the thin film of water, which at this point had a temperature of 1.8° C. and was substantially free of frozen water. The solubilization level of carbon dioxide in the film of water was about 3.5% by weight of the water. Hydrate crystals of bound carbon dioxide and water began to form immediately on contact of the $CO_2$ saturated solution with the cool walls of the heat exchanger to give a slush-like film which had a temperature of 1.6° C. as it approached the outlet end of the heat exchanger. Under these conditions of pressure, temperature and feed rate a residence time of about 2 minutes was allowed for the carbon dioxide-water mixture to issue into the pressurized mold 18 in a form of a hydrate slush which at this point still contained a substantial portion of unfrozen free water. The temperature of the slush as it entered the mold was about 1.5° C.

When the mold was filled it was sealed at a pressure of 250 p.s.i.g., removed from the discharge end of the heat exchanger as another mold was substituted and then placed in the propylene glycol bath having a temperature of $-23°$ C. in order to freeze the water present in the mixture. The product in the sealed mold took about 20–30 minutes to freeze to a temperature of below $-3°$ C. The final product had a level of about 50 cc. of carbon dioxide measured as a gas per gram ice, about 58% by weight of the product was in the form of frozen free water ice while about 42% by weight of the product was in the form of frozen hydrate. The frozen carbonated ice product could then be cut into 2 inch sections suitable for carbonating a liquid.

*Example II*

The procedure of Example I was followed with the exception that the water feed rate was 75 cc. per minute and the carbon dioxide feed rate was 24,000 cc. per minute (S.T.P.). The pressure in the heat exchanger and the pressurized mold was adjusted to 150 p.s.i.g. The temperature of the refrigerant in the cooling jacket was lowered to $-13°$ C. Under these conditions of pressure, temperature, and feed rate, the residence time for forming hydrated product from the $CO_2$-water mixture was 6 minutes and the formation of frozen crystals of unhydrated water was avoided. The temperature of the discharged hydrate as it entered the pressurized mold chamber was $-1.5°$ C. The slush-like product was then frozen to a temperature below $-30°$ C. in about 20–30 minutes similar to Example I. The final product had a level of about 32 cc. of carbon dioxide per gram of ice and about 26% by weight of the product was in the hydrated form.

While this invention has been described by reference to several specific examples, and particularly by reference to a particular apparatus whereby hydrate is continuously produced and subsequently stabilized by converting the intimate mixture of hydrate and water ice to the carbonated ice product, it is intended to be limited by the scope of the following appended claims only. The present invention is characterized by the intimate contact initially brought about between carbon dioxide supplied at a substantially uniform pressure and the aqueous liquid in which it is initially dissolved and subsequently combined to form hydrate and water ice. By virtue of the continuous production of the hydrate, manufacturing economies can be realized and a more constant and uniform carbonated ice product recovered. Moreover, a broad range of controllable pressure and temperature conditions can be practiced in realizing these manufacturing economies and product uniformities. Advantageously, although it is preferred that the conditions for hydrate formation in the process be carried out gradually such conditions are relatively rapid in comparison to the batch autoclave technique described in the aforesaid Barnes et al. patent. Due to this relatively rapid hydrate formation, a carbonated ice product is attainable of improved stability in comparison to the carbonated ice product of a batch technique such as that described in the Barnes et al. patent; the carbonated ice product is better able to withstand surrounding environments to which it will be exposed during packaging, handling and use without popping or exploding. While the invention is not to be restricted to any particular theory it is believed that this improvement in stability stems from the relatively smaller uniform hydrate crystal formed in producing the hydrate slush.

What is claimed is:

1. A process for producing a carbonated ice, which comprises forming a film of an aqueous liquid at a temperature of about $-3°$ to 10° C., contacting the film with carbon dioxide gas at a pressure sufficiently high to form with the liquid quantities of a carbon dioxide-water hydrate, said hydrate being distributed in the liquid and forming a slush therewith, transferring the slush to a freezing zone under conditions of temperature and pressure at which the hydrate in the slush is maintained without substantial change, and reducing the temperature of the slush to less than $-3°$ C. for a period of time sufficient to freeze the liquid in the slush.

2. A process as claimed in claim 1, in which the aqueous liquid is water and the film of aqueous liquid is at a temperature of about 0° to 10° C.

3. A process as claimed in claim 1, in which the freezing zone to which the slush is transferred is in the form of a mold.

4. A process as claimed in claim 1, in which the pressure of the carbon dioxide gas in contact with the film is about 140 to 650 p.s.i.g.

5. A process for producing a carbonated ice, which comprises forming a film of an aqueous liquid at a temperature of about $-3°$ to $10°$ C. in a carbonating zone by continuously introducing the aqueous liquid into the zone, introducing carbon dioxide gas into the zone at a pressure sufficiently high to form with the liquid film quantities of a carbon dioxide-water hydrate, the hydrate being distributed in the liquid and forming a slush therewith, withdrawing slush from the carbonating zone at a rate such that the amount of liquid in the zone remains substantially constant and under conditions of temperature and pressure at which the hydrate in the slush is maintained without substantial change, receiving the slush at a freezing zone, and reducing the temperature of the slush at the freezing zone to less than about $-3°$ C. for a period of time sufficient to freeze the liquid in the slush.

6. A process for producing a carbonated ice, which comprises continuously introducing an aqueous liquid into a carbonating zone, maintaining the temperature of the liquid in the carbonating zone at about $-3°$ to $10°$ C., continuously introducing carbon dioxide gas into the carbonating zone and into contact with the film at a pressure sufficiently high to form with the liquid quantities of a carbon dioxide hydrate, the carbon dioxide hydrate being distributed in the liquid and forming a slush therewith, gradually withdrawing slush and carbon dioxide gas from the carbonating zone at a rate such that the amount of liquid in the zone is maintained substantially constant and the pressure of the carbon dioxide gas in the zone is likewise maintained substantially constant, receiving the slush at a freezing zone, and reducing the temperature of the slush at the freezing zone to below at about $-3°$ C. for a period of time sufficient to freeze the liquid in the slush.

7. A process as claimed in claim 6, in which the dwell time of liquid in the carbonating zone is about 20 to 90 seconds.

8. A process for producing a carbonated ice, which comprises introducing chilled water into a vessel provided with cooling means, forming a film of the water on the inner surface of the vessel by means of wiping blades located within the vessel, introducing carbon dioxide gas into the vessel and against the film of water at a pressure of at least about 200 p.s.i.g., maintaining the film of water in the vessel at a temperature of about $0°$ to $10°$ C. to form a water-carbon dioxide hydrate in the water, the hydrate forming a slush with the water, continuously removing slush from the vessel while maintaining the amount of water and the carbon dioxide pressure therein substantially constant after the hydrate has formed in the vessel over a period of about 20 to 90 seconds, delivering the slush to a mold, and freezing the slush in the mold at a temperature below $-3°$ C.

9. A process as claimed in claim 8, in which the chilled water and the carbon dioxide gas are simultaneously introduced into the vessel through the same input line.

References Cited by the Examiner
UNITED STATES PATENTS

| | | | |
|---|---|---|---|
| 2,975,603 | 3/1961 | Barnes | 62—1 |
| 3,086,370 | 4/1963 | Barnes | 62—1 |

EDWARD J. MICHAEL, *Primary Examiner.*